United States Patent [19]

Sassier

[11] Patent Number: 4,763,113

[45] Date of Patent: Aug. 9, 1988

[54] TEMPERATURE MONITORING METHOD USING A FIRE WIRE

[75] Inventor: Pierre H. Sassier, Bercheres sur Vesgre, France

[73] Assignee: Thomson-CSF, Paris, France

[21] Appl. No.: 910,921

[22] Filed: Sep. 24, 1986

[30] Foreign Application Priority Data

Sep. 27, 1985 [FR] France ............................... 85 14379

[51] Int. Cl.⁴ ............................................ G08B 17/06
[52] U.S. Cl. ..................................... 340/596; 338/26
[58] Field of Search ........................ 340/596; 338/26; 374/102, 110, 111

[56] References Cited

U.S. PATENT DOCUMENTS

| 2,659,067 | 11/1953 | Peters | 340/596 |
| 3,059,229 | 10/1962 | Tava et al. | 340/596 |
| 4,175,437 | 11/1979 | Burt | 340/596 |
| 4,361,799 | 11/1982 | Lutz | 338/26 |

*Primary Examiner*—Glen R. Swann, III
*Attorney, Agent, or Firm*—Pollock, VandeSande & Priddy

[57] ABSTRACT

A method for monitoring temperature in an enclosed space, especially a means of transportation such as an aircraft is disclosed. The method uses a wire or cable which has, between an inner conductor and an outer conductor, an element made of a material, the resistivity and dielectric permittivity of which vary with temperature. At one end of the cable, a check is made on the product RC of the resistance and the capacitance between the central conductor and the outer conductor.

5 Claims, 1 Drawing Sheet

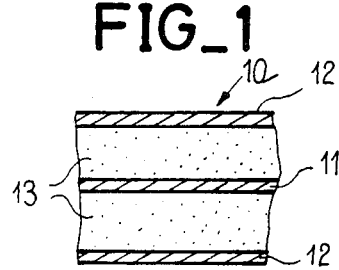
FIG_1
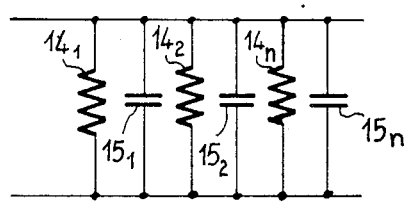
FIG_2
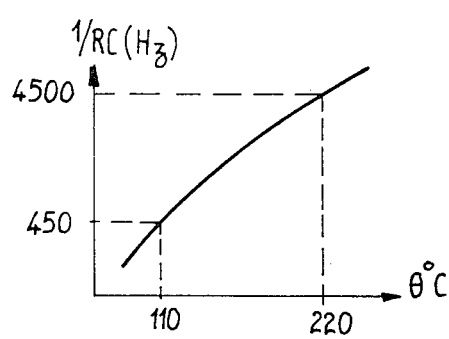
FIG_3
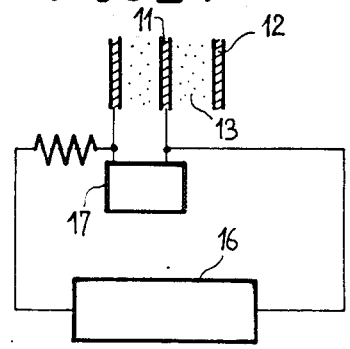
FIG_4
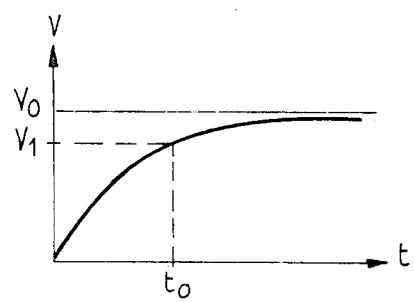
FIG_5
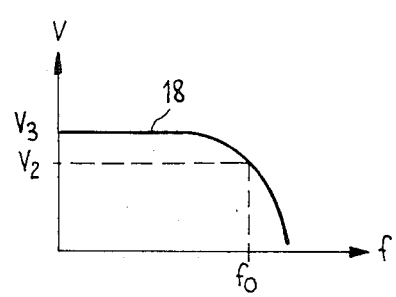
FIG_6

TEMPERATURE MONITORING METHOD USING A FIRE WIRE

FIELD OF THE INVENTION

The invention pertains to a temperature-monitoring method and device using a wire or cable, especially in order to detect fires.

BACKGROUND OF THE INVENTION

In certain means of transportation, especially aircraft, provision is often made for a temperature-monitoring means to check whether there is any abnormal heating at determined locations (in particular the engines) which are most at risk for fire. To this end, use is made of a coaxial wire or cable which has, between the central conductor (or core) and the outer conductor, a sheathing made of a material (which is generally semi-conducting), with resistivity varying with temperature. This cable generally follows a path that passes through the zones subject to the greatest risk, and the monitoring is done by continuously or periodically measuring the resistance at one end of the cable between the core and the outer conductor, the said resistance depending on the resistivity of the material which comprises the intermediate element and, hence, on the temperature. If the relative variation of the resistance exceeds a pre-determined value, an alarm is triggered.

The resistance measured between the core and the outer conductor is inversely proportional to the length of the cable. Thus, it follows that measuring resistance alone does not give a precise determination of the variation in temperature since, for one and the same temperature, the variation in resistance depends on the length of that part of the cable on which the heating occurs. This is why, until now, a fire wire monitoring device has been used only to trigger one alarm. But even for this method of single use, the lack of precision may cause an alarm to be triggered when the heating is still at a permissible level.

SUMMARY OF THE INVENTION

The invention can be used to determine the temperature (or its variation) with far greater precision and to avoid triggering an alarm in situations which do not call for any such alarm to be triggered.

To this end, the device according to the invention comprises a means for measuring the product RC, when R is the resistance and C is the capacitance between the core and the outer conductor. Since the resistance is inversely proportional to the length and since the capacitance is proportional to the length, the product RC is thus independent of this length. Consequently, the variation of the product RC gives a precise measurement of the temperature variation which is hardly affected by the length of the cable which undergoes heating.

The product RC, i.e. the time constant $t_0$ of the circuit RC which is constituted by the cable, is measured, for example, by determining the frequency response curve of a filter which is constituted by this circuit.

BRIEF SUMMARY OF THE DRAWINGS

Other characteristics and advantages of the invention will appear in the description of certain of its modes of embodiment, the description being made with reference to the appended drawings wherein:

FIG. 1 is an axial cross-section diagram of a wire or cable that is sensitive to temperature, FIG. 2 is an electrical diagram equivalent to the cable of FIG. 1, FIG. 3 is a diagram showing a property of the cable of FIG. 1, FIG. 4 is a diagram of a measuring device, and FIGS. 5 and 6 are graphs illustrating methods for measuring temperature by means of the cable in FIG. 1.

DESCRIPTION OF THE PREFERRED EMBODIMENT

A temperature-sensitive cable 10 (FIG. 1) is made up of a central conductor or core 11, a peripheral conductor, 12, and a semi-conducting, intermediate material, 13. The resistivity and dielectric permittivity of the intermediate material 13 varies with temperature. A cable of this type is sold, for example, by the THERMOCOAX Company.

A cable, 10, of this type, is used particularly in aircraft or other means of transportation in order to detect occurrences of abnormal heating. To this end the cable 10 is, laid out in a path that passes through locations where there is a risk of fire. The end of the cable is set, for example, in the pilot's cabin with (in the prior art) means for measuring the resistance between the core, 11, and the outer conductor, 12. If heating occurs, there is a variation in resistivity and an alarm is triggered if the variation exceeds a pre-set limit.

As already indicated above, the variation in resistance cannot be used to measure the temperature with precision. For the cable 10 may be considered as comprising a set of elementary resistors $14_1$, $14_2$ ... $14_n$ (FIG. 2) in parallel, each having the value R. Thus, the resistance measured at the end of the cable between the core 11 and the conductor 12 is inversely proportional to the length of this cable. The variation in resistance therefore depends on the length along which the heating occurs.

Besides, the sheathing 13 has a dielectrical permittivity which varies with the temperature. Thus, the cable 10 may also be considered as being formed of elementary capacitors $15_1$, $15_2$ ... $15_n$ and the capacitance measured at the end of the cable is also proportional to the length.

In contrast, the product RC is independent of the length. This is why if we measure the quantity RC, which constitutes a time constant, we obtain a relatively precise indication of the temperature.

FIG. 3 shows the variation of the quantity 1/RC, expressed in Hertz, with the temperature $\theta$ expressed in degrees Celsius. It is seen that, for the temperature of 110° C., 1/RC has a value of 450 Hertz while for 220° C., 1/RC=4,500 Hertz.

There are various possible ways to measure the quantity 1/RC or RC. In an initial example, at the end of the cable 10, a pulse generator 16 (FIG. 4) is used to input a pulse $V_0$ (FIG. 5) between the conductors 11 and 12, and a circuit 17 determines the time $t_0$, proportional to RC, at the end of which the signal between the conductors 11 and 12 reaches a value $V_1$ which is slightly smaller than $V_0$.

In another embodiment, the response curve 18 (FIG. 6) constituted by the filter RC (formed by the semi-conductive material 13) is determined. This response curve represents a variation in level of the output signal V as a function of the frequency f. The frequency $f_0$, proportional to 1/RC, is that frequency for which the output signal of the filter has the value $V_2$, which is slightly smaller than the input signal $V_3$.

Regardless of the type of measurement made, it is advisable that length f, along which the cable extends in the fire-risk locations, in relation to the total length L of this cable, should be chosen in accordance with the precision that is desired. The following considerations will make it possible to determine the lengths L and f as well as the nature of the material that constitutes the sheathing 13.

Below, $r_A$ designates the resistance offered per unit of length, between the core and the outer conductor, by the sheathing 13 at ambient temperature. $r_T$ represents the same quantity but for a temperature T greater than ambient temperature.

Thus, the resistance values of the sheathing 13, firstly, along the length f ($R_T$ at a temperature T) and secondly, along the length L-f ($R_A$ at ambient temperature), are as follows:

$$R_T = \frac{r_T}{f} \text{ and } R_A = \frac{r_A}{L-f} \tag{1}$$

At the end of the cable, the resistance R between the core and the outer conductor is therefore:

$$R = \frac{R_T R_A}{R_T + R_A} \tag{2}$$

that is:

$$R = \left(\frac{r_A r_T}{f(L-f)}\right)\left(\frac{1}{\frac{r_T}{f} + \frac{r_A}{L-f}}\right) = r_T \frac{r_A}{(L-f)r_T + f r_A} ; \tag{3}$$

$c_A$ is the capacitance presented by the cable, per unit of length, between the core and the conductor at ambient temperature and $c_T$ is the same quantity, but at the temperature T. We can write:

$$c_1 = (L-f)c_A$$

and $$c_2 = f c_T \tag{4}$$

at the end of the cable, the value of the capacitance C between the core and the outer conductor is:

$$C = c_1 = c_2 \tag{5}$$

that is:

$$C = c_T\left[(L-f)\frac{c_A}{c_T} + f\right] \tag{6}$$

thus:

$$RC = r_T c_T \frac{r_A}{(L-f)r_T + f r_A}\left[(L-f)\frac{c_A}{c_T} + f\right];$$

$$RC = r_T c_T \frac{f}{(L-f)\frac{r_T}{r_A} + f}\left[\frac{L-f}{f}\frac{c_A}{c_T} + f\right];$$

$$RC = r_T c_T \frac{f}{\frac{L-f}{f}\frac{r_T}{r_A} + f}\left[f + \frac{L-f}{f}\frac{c_A}{c_T}\right];$$

finally:

$$RC = r_T c_T \frac{f + \left(\frac{L}{f} - f\right)\frac{c_A}{c_T}}{1 + \left(\frac{L}{f} - 1\right)\frac{r_T}{r_A}} \tag{7}$$

From the above formula (7), it can be deduced that if the product RC is to be hardly affected by the length, the nature of the sheathing material 13 should be chosen in such a way that:

$$c_A/c_T = r_T/r_A \tag{8}$$

Of course, it will not generally be possible to meet the condition of equality between the values $c_A/c_T$ and $r_T/R_A$ for all temperatures. In contrast, the material, and hence its values, $c_A$, $c_T$, $r_T$, $r_A$, can be chosen so as to obtain strict equality for the smallest time constant ($T_0$) of the temperatures for which the fire risk is considered to exist. This temperature is, for example, 110° C.

Thus, in the case of the example mentioned above, the values $r_T/r_A$ and $c_A/c_T$ are both 0.04 for T=110° C. and A=20° C.

It must be noted that the minimum temperature is detected just at the start of the trouble, that is, at a moment when the length f is relatively low; in these circumstances, if the condition (8) is not met, RC will have a value that diverges from that of $r_T c_T$ as is shown by the formula (7) above. In contrast, after the trouble has begun, the heat spreads and increases the length f, a fact that contributes to making the factor of $r_T c_T$ in the formula (7) approach unity and at least partly compensates for the divergence of $c_A/c_T$ from $r_T/r_A$ in this factor. It is generally true that, as time passes, the temperature T increases. Another fact that contributes to maintaining precision is that resistance and capacitance vary inversely to each other depending on the temperature.

In the above example, it was also observed that, for temperatures greater than 110° C., the divergence of RC with respect to $r_T c_T$ remained relatively low, with a maximum of about 10%, even if the ratios L/f varied greatly. The temperature in locations at risk can thus be measured with a satisfactory degree of precision, at least for a determined range of temperatures, for example, between 110° C. and 220° C.

Since the invention provides a means for measuring temperature which is hardly affected by the length of the cable, the likelihood of triggering false alarms is substantially reduced as compared with monitoring devices in the prior art.

What is claimed is:

1. A method for monitoring temperature in an enclosed space, particularly in a transportation vehicle such as an aircraft, using a wire or cable which has, between an inner conductor and an outer conductor, an element made of material whose resistivity and dielectric permittivity vary according to temperature, wherein in order to monitor the said temperature, a product of resistance and capacitance between the inner conductor and the outer conductor is determined at an end of the cable.

2. A method according to claim 1 wherein, to determine the product of resistance and capacitance (RC), a continuous signal is applied to said end of the cable between the inner and outer conductor and a measurement is made of the time taken by a signal measured between said inner and outer conductor to reach a determined value.

3. A method according to claim 1 wherein the product of resistance and capacitance (RC) is determined by establishing a response curve of the cable as a function of frequency.

4. A method according to any one of claims 1 to 3 wherein the material constituting the said element is such that:

$$c_A/c_T = r_T/r_A$$

where $r_A$ and $C_A$ are respectively the resistance and capacitance of the cable per unit of length at ambient temperature and where $r_T$, $c_T$ are the same resistances and capacitances but at the temperature T which is the minimum temperature at which it is sought to trigger an alarm.

5. Application of the method, according to claim 1, to a temperature-monitoring installation.

* * * * *